United States Patent
Wood et al.

(10) Patent No.: US 11,775,479 B2
(45) Date of Patent: Oct. 3, 2023

(54) SYSTEM AND METHOD FOR EFFICIENT AND SECURE PRIVATE SIMILARITY DETECTION FOR LARGE PRIVATE DOCUMENT REPOSITORIES

(71) Applicant: LUTHER SYSTEMS US INCORPORATED, Los Gatos, CA (US)

(72) Inventors: Samuel Wood, Los Altos Hills, CA (US); Hossein Kakavand, London (GB)

(73) Assignee: LUTHER SYSTEMS US INCORPORATED, Los Gatos, CA (US)

(*) Notice: Subject to any disclaimer, the term of this patent is extended or adjusted under 35 U.S.C. 154(b) by 800 days.

(21) Appl. No.: 16/413,580

(22) Filed: May 15, 2019

(65) Prior Publication Data

US 2019/0361842 A1 Nov. 28, 2019

Related U.S. Application Data

(60) Provisional application No. 62/676,194, filed on May 24, 2018.

(51) Int. Cl.
| | |
|---|---|
| G06V 30/00 | (2022.01) |
| G06F 16/14 | (2019.01) |
| H04L 9/06 | (2006.01) |
| G06F 16/17 | (2019.01) |
| G06V 30/418 | (2022.01) |
| H04L 9/00 | (2022.01) |

(52) U.S. Cl.
CPC ........ *G06F 16/152* (2019.01); *G06F 16/1734* (2019.01); *G06V 30/418* (2022.01); *H04L 9/0637* (2013.01); *H04L 9/0643* (2013.01); *H04L 9/50* (2022.05)

(58) Field of Classification Search
None
See application file for complete search history.

(56) References Cited

U.S. PATENT DOCUMENTS

| | | |
|---|---|---|
| 5,680,611 A | 10/1997 | Rail et al. |
| 5,696,898 A | 12/1997 | Baker |
| 5,892,900 A | 4/1999 | Ginter et al. |

(Continued)

FOREIGN PATENT DOCUMENTS

| | | |
|---|---|---|
| GB | 2571390 A | 8/2019 |
| WO | WO 2015/171580 | 12/2015 |
| WO | WO2018201009 A1 | 11/2018 |

OTHER PUBLICATIONS

Selimi et al., Paril 2, 2018. Towards Blockchain-enabled Wireless Mesh Networks. pp. 13-18.*

(Continued)

*Primary Examiner* — Tuankhanh D Phan
(74) *Attorney, Agent, or Firm* — Manatt, Phelps & Phillips, LLP

(57) ABSTRACT

A system and method for efficient and secure private similarity detection for large private document repositories reduces the amount of trust that the participants need to give to a third party and detects malicious participants. One use of this system and method is the efficient and secure detection of similar documents across large private document repositories.

28 Claims, 9 Drawing Sheets

(56) References Cited

U.S. PATENT DOCUMENTS

| | | |
|---|---|---|
| 8,918,890 B2 | 12/2014 | Nakazawa |
| 10,075,298 B2 | 9/2018 | Struttmann |
| 10,579,974 B1 | 3/2020 | Reed |
| 11,126,975 B2 | 9/2021 | Haldenby et al. |
| 11,223,877 B2 | 1/2022 | Madiesetti |
| 2002/0120682 A1 | 8/2002 | Funaki |
| 2003/0233357 A1 | 12/2003 | Merenda |
| 2007/0239589 A1 | 10/2007 | Wilson et al. |
| 2015/0221034 A1 | 8/2015 | Nyhoff et al. |
| 2015/0244690 A1 | 8/2015 | Mossbarger |
| 2015/0332283 A1 | 11/2015 | Witchey |
| 2015/0379510 A1 | 12/2015 | Smith |
| 2016/0028552 A1 | 1/2016 | Spanos |
| 2016/0357550 A1 | 12/2016 | Thomas et al. |
| 2017/0048217 A1 | 2/2017 | Biggs et al. |
| 2017/0075938 A1 | 3/2017 | Black et al. |
| 2017/0091750 A1 | 3/2017 | Maim |
| 2017/0103385 A1 | 4/2017 | Wilson, Jr. et al. |
| 2017/0103468 A1 | 4/2017 | Orsini et al. |
| 2017/0193619 A1 | 7/2017 | Rollins et al. |
| 2018/0323975 A1* | 11/2018 | Curbera ............... H04L 9/3236 |
| 2018/0341648 A1 | 11/2018 | Kakavand et al. |
| 2018/0341678 A1 | 11/2018 | Moerkotte et al. |
| 2019/0286102 A1* | 9/2019 | Carbone ............... B33Y 50/02 |
| 2019/0361842 A1 | 11/2019 | Wood et al. |
| 2020/0111092 A1 | 4/2020 | Wood et al. |
| 2020/0159697 A1 | 5/2020 | Wood et al. |
| 2020/0201964 A1 | 6/2020 | Nandakumar |
| 2021/0056070 A1 | 2/2021 | Kakavand et al. |

OTHER PUBLICATIONS

Mildred Okoye. New Applications of Blockchain Technology to Voting and Lending. Nov. 2017.*

Reed, "Distributed Intelligent Agents System and Method For Securely Operating a Digital Virtual Currency", U.S. Appl. No. 62/116,853, filed Feb. 16, 2015.

Esposito et al., "Blockchain: A Panacea for Healthcare Cloud-Based Data Security and Privacy?", IEEE Cloud Computing, vol. 5, Jan./Feb. 2018, pp. 31-37 (8 pages).

Manber, Udi, entitled, "Finding Similar Files in a Large File System," TR 93-33—1994 Winter USENIX Technical Conference, Department of Computer Science, The University of Arizona, Tucson, Arizona, (Oct. 1993), 11 pages.

The Intel Xeon Scalable—A Truly Big Day for the Data Center, Intel's Newest Platform Designed for the Data Center is its Highest Performance, Most Versatile Ever, Jul. 11, 2017, 5 pages.

Clack et al. "Smart Contract Templates: essential requirements and design options." In: arXivpreprint. Dec. 15, 2016 (Dec. 15, 2016), 15 pages. Retrieved from: https://arxiv.org/pdf/1612.04496.pdf.

Kakavand et al. "The blockchain revolution: An analysis of regulation and technology related to distributed ledger technologies." Oct. 12, 2016 (Oct. 12, 2016), 27 pages. Retrieved from: https://papers.ssrn.com/sol3/papers.cfm?abstract_id=2849251.

Kosba et al. "Hawk: The blockchain model of cryptography and privacy-preserving smart contracts." In: IEEE symposium on security and privacy. May 26, 2016 (May 26, 2016), 20 pages. Retrieved from: https://ieeexplore.ieee.org/stamp/stamp.jsp?tp=&arnumber=7546538.

Peters et al., "Understanding modern banking ledgers through blockchain technologies: Future of transaction processing and smart contracts on the internet of money." In: Banking Beyond Banks and Money. Nov. 18, 2015 (Nov. 18, 2015), 33 pages. Retrieved from: https://arxiv.org/pdf/1511.05740.pdf.

Hassan et al., "Blockchain and The Future of the Internet: A Comprehensive Review," Information Technology University (ITU), Punjab, Pakistan, Feb. 23, 2019, 21 pages. Retrieved from: https://arxiv.org/pdf/1904.00733.pdf.

Ali, Robert et al., entitled, "Innovation in payment technologies and the emergence of digital currencies," Quarterly Bulletin, (2014) Q3, pp. 262-275.

Vipula, Rawte et al., entitled, "Fraud Detection in Health Insurance Data Mining Techniques," 2015 International Conference on Communication, Information & Computing Technology (ICCICT), (Jan. 16-17, 2015), 6 pp.

Bahmani, Raad et al., entitled, "Secure Multiparty Computation from SGX," 38 pp.

BitFury Group, entitled, "Proof of Stake versus Proof of Work," White Paper, (Sep. 13, 2015), pp. 1-26.

Bloom, Burton H. , entitled, "Space/Time Trade-offs in Hash Coding with Allowable Errors," Communications of the ACM, (Jul. 1970), vol. 13, No. 7, pp. 422-426.

Doerner, Jack, entitled, "An Introduction to Practical Multiparty Computation," 53 pp.

Fan, Li et al. , entitled, "Summary Cache: A Scalable Wide-Area Web Cache Sharing Protocol," IEEE/ACM Transactions on Networking, (Jun. 2000),. vol. 8, No. 3., pp. 281-293.

"Intel$^R$ Software Guard Extension (SGC) Remote Attestation End-To-End Sample," GitHub, (2018), 9 pp.

O'Keeffe, Dan et al., entitled, "Spectre-attack-sgx," GitHub, (2018), 2 pp.

Kakavand, Hossein et al., entitled, "The Blockchain Revolution: An Analysis of Regulation and Technology Related to Distributed Ledger Technologies," 27 pp.

Kwon, Jae, entitled, "Tendermint: Consensus without Mining," Draft v.0.6., pp. 1-11.

Lamport, Leslie et al., entitled, "The Byzantine Generals Problem," ACM Transactions on Programming Languages and Systems, (Jul. 1982), vol. 4, No. 3, pp. 382-401.

Manber, Udi, entitled, "Finding Similar Files in a Large File System," 1994 Winter USENIX Technical Conference, (Oct. 1993), 1-10 pp.

Nakamoto, Satoshi, entitled, "Bitcoin: A Peer-to-Peer Electronic Cash System," pp. 1-9.

Pilkington, Marc, entitled, "Blockchain Technology: Principles and Applications," Blockchain Technology: Principles and Applications, 39 pp.

Pinkas, Benny et al., entitled, "Phasing: Private Set Intersection using Permutation-based Hashing," Usenix Security, (2015) PSSZ15, pp. 1-21.

Rindal, Peter et al., entitled, "Improved Private Set Intersection against Malicious Adversaries," (Oct. 3, 2016), pp. 1-18.

"Summary of the HIPAA," Health Information Privacy, U.S. Department of Health and Human Services, (2013), pp. 8.

"The Intel Xeon Scalable—A Truly Big Day for the Data Center," (Jul. 11, 2017), 5 pp.

Association of International Certified Professional Accountants, Blockchain Universal Glossary, (Year: 2020).

Bitcoind—Bitcoin Wiki (Year: 2019).

How to Setup Bitcoin Core—Youtube (Year: 2020).

Running A full Node—Bitcoin (Year: 2022).

Running Bitcoin—Bitcoin Wiki (Year: 2019).

Yaga, et al., "Blockchain Technology Overview", NIST.IR. 8202, Oct. 2018, https://doi.org/10.6028/NIST.IR.8202, 68 pgs.

Keritsis, U.S. Appl. No. 16/383,720, Notice of Allowance and Fees Due (PTOL-85), dated Oct. 25, 2021, 9 pgs.

* cited by examiner

```
// SubsetIndices returns a list of all subsets of size k from an
// original set of size N.  A subset is represented as a list of
// indices into the original set.
//
// Example:
//    SubsetIndices(3, 2) == [[0, 1], [0, 2], [1,2]]
SubsetIndices(N, k):
// ... omitted for space // ReceiveClaim is the logic in the oracle to generate hashes that are
// then sent to the chaincode.
// C is the claim,
// ImmutableFields is a list of names of fields that cannot change in
// fraud (i.e. Social Security Number).
// H is a robust, slow hash function,
// SHA1 is a fast hash function used to normalize text fields,
// NumChanges are the maximum number of changes in the claim that
// are detected.
ReceiveClaim(C, ImmutableFields, H, NumChanges):
      propSep ← ":"
      attrSep ← "\n"
      hashes ← []
      values ← []
      prefix ← ""  // prefix includes all immutable fields
      for k, v in KeyValues(C):
            propHash ← SHA1(k + propSep + v)
            if not k in ImmutableFields:
                  // append key to each value
                  values ← values + [ propHash ]
            else:
                  prefix ← prefix + attrSep + propHash indices ← SubsetIndices(len(values), NumChanges)
      for j = 0; j < len(indices); j++:
            preimage ← ""
            for k = 0; k < len(indices[j]); k++:
                  preimage ← preimage + attrSep + values[k]
            hashes ← hashes + [ H(prefix + preimage) ]
      Shuffle(hashes)
      return SubmitHashesToSmartContract(hashes)
```

FIGURE 7

```
NumHashesPerClaim = 36
// ReceiveHashes receives a set of hashes for a claim and checks if it
// is already in the repository.
PutHashesInRepository(hashes):
        dupe ← false
        now ← GetNowTimestamp()
        for _, hash in hashes:
                timestamp ← LoadTimestamp(hash)
                if timestamp exists:
                        dupe ← true
                StoreTimestamp(hash, now)
                StoreKey(MakeKey(now, hash))
        return dupe
```

FIGURE 8

```
// RemoveExpiredHashes removes hashes that are older than
// maxClaimAgeDays
RemoveExpiredHashes(maxClaimAgeDays):
        keys ← GetKeysInRange("", GetPastTimestamp(maxClaimAgeDays))
        numHashesExpired ← 0
        numHashesRemoved ← 0
        for _, key in keys:
                numHashesExpired++
                DeleteKey(key)
                hash ← HashFromKey(key)
                timestamp ← TimestampFromKey(key)
                lastTimestamp ← LoadTimestamp(hash)
                if timestamp == lastTimestamp:
                        numHashesRemoved++
                        DeleteKey(hash)
                elif timestamp < lastTimestamp:
                        // nothing to do here -- there is a newer, dupe claim
        numClaimsExpired ← ceil(numHashesExpired/NumHashesPerClaim)
        return numHashesExpired, numClaimsExpired
```

FIGURE 9

SYSTEM AND METHOD FOR EFFICIENT AND SECURE PRIVATE SIMILARITY DETECTION FOR LARGE PRIVATE DOCUMENT REPOSITORIES

PRIORITY CLAIMS/RELATED APPLICATIONS

This application claims the benefit under 35 USC 119(e) and priority under 35 USC 120 to U.S. Provisional Patent Application 62/676,194, filed May 24, 2018 and entitled "EFFICIENT AND SECURE PRIVATE SIMILARITY DETECTION FOR LARGE PRIVATE DOCUMENT REPOSITORIES, SYSTEM AND METHOD", the entirety of which is incorporated herein by reference.

FIELD

The present system and method relates to the processing, comparison, storage, and management of private document data and metadata.

BACKGROUND

In many industries, especially within the insurance industry, a network of participants requires the ability to detect similar documents across each participant's private repository. For example, multiple insurance providers often need to detect fraud by determining if the same or a similar claim was filed with another insurer. Other examples include private watchlists containing the profile of suspicious individuals that are maintained by separate land, sea and air port authorities. Further examples include, Procurement fraud, Mortgage fraud, Tax fraud, Motor Finance fraud, Benefits fraud.

In many cases the participants desire to keep the contents of their repository private from the other participants. Additionally, the document being checked against these private repositories (the query) should also be kept private. The documents themselves sometimes contain Personal Identifiable Information (PII), and are subject to data storage and processing requirements to ensure user privacy (e.g., PCI DSS, HIPPA1 compliance). The documents across the repositories may have slight differences yet still be considered a duplicate, which requires systems to include a document similarity metric that detects similar documents. When a participant determines that a document is a duplicate, then they may also need to determine which participant contains the duplicate document in order to perform subsequent processing (e.g., notify the corresponding participant's fraud department).

These applications must be secure, meaning that malicious participants and external actors must be detected on the network, their attacks must be mitigated, and they must be promptly removed from the network. To avoid deception, these applications must prevent participants from discovering documents that they do not have. In particular, the system must provide safeguards to ensure that querying participants can only query for authorized documents (e.g., documents similar to those that are already in their possession), to prevent malicious participants from determining the contents of the private repositories.

Trusted Third Party: Most solutions for these applications today use a trusted third party. In the most basic approach, the participants periodically submit their documents to the third party. When a participant desires to determine whether a similar document exists, it submits the queried document to the third-party who subsequently checks their local copy of each participants' repository. If there is not a similar document then the third party informs the querying participant that there is not a match. Otherwise, the third party informs the querying participant that there is a match, and may possibly include the names of the other participants that contain the similar documents. The third-party is trusted by all of the participants to securely manage their data and control access to the data. Specifically, the third-party is trusted to i) not divulge any of the documents or queries to any of the other participants, ii) correctly answer queries to only the agreed upon participants who already have the queried document. Companies such as Experian perform these centralized services within the insurance industry. As another example, for auto insurance within the United States, the C.L.U.E. system run by LexisNexis is used by 99% of auto-insurers where all claim history is shared on this database and informs insurers of duplicate claims made by the same person. These claims record fields consistent across all claims, including: Name, Date of Birth, Policy Number, Claim information, Date of Loss, Type of Loss, Amounts Paid, and Vehicle Information.

Traditionally, within a single trusted third party or single organization checksum-based2 or hashing (e.g., Locality-Sensitive Hashing) approaches are applied to a document corpus to quickly identify similar documents. Hashing based approaches are a performance optimization to quickly detect similar documents, and not employed in this context for security purposes. Data mining and machine learning techniques are increasingly being applied to insurance claim data to identify duplicate claims3 as an improvement in fraud detection accuracy over these traditional approaches. These techniques are only effective in centralized systems where a single organization has direct access to all of the data being processed.

In many cases the network of participants cannot all agree on a single trusted third party. The third party gains valuable insight into the private operations of each participant. The sensitive data prevents any single participant from playing the role of the third party since the participants are often competing businesses. Often times there does not exist such a neutral third party that can be entrusted with this sensitive data. Participants may be unwilling to volunteer the sensitive details of their customers to a central entity, especially if the data includes international customers (e.g., due to GDPR EU regulation). As recent cyberattacks have demonstrated, large central repositories of valuable data are notoriously difficult to protect and can become a liability. Third parties are put in a dominant position whereby they can extract high fees and provide non-optimal service (e.g., slow transaction processing resulting in delays). There is a lack of transparency into the operations of the third party which increases the risks for the participants and requires additional auditing and oversight from more trusted third parties (e.g., government regulators).

Semi-trusted Third Parties: To address some of these trust concerns, applications may take a semi-trusted third party approach. In this model, the participants agree on a third-party but only share encrypted documents with the third party which the third party cannot decrypt directly. For example, the network of participants may agree on a cryptographic hash function (see definition below) and send the hashes of their documents to the third party, instead of the documents themselves. When a participant performs a query they apply the same hash function to their document and send this to the third party who then compares the hash against the existing lists of hashes. This approach described here only works for finding identical documents (exact match), however there are extensions to this approach that apply multiple hashes to construct signatures (or fingerprints) that are used to measure similarity. For a representative example of this fingerprint approach, See the paper "Finding Similar Files in a Large File System", by Udi Manber, WETC 1994.

Preimage Attacks: With this semi-trusted third party approach, the third party only receives and stores cryptographic hashes and does not receive the original documents. If the domain of documents is relatively small then cryptographic hashes may not provide enough security to prevent the third party from being able to reconstruct the original documents. For example, if the documents only contain a license plate number and the hash function is SHA256, then with minimal effort the third party could compute cryptographic hashes of every single license plate number to construct a dictionary that maps hashes to license plate numbers. This dictionary allows the third party to reconstruct the original license plate numbers submitted to it. This type of pre-image resistance problem is analogous to the problem of securing storing passwords in a database, and similar solutions can be applied. Namely, the hash function can be selected to be computationally difficult to compute, for example using the "bcrypt" hash function or the Password-Based Key Derivation Function (PBKDF2) standard. These hash functions are slow to compute which makes constructing the dictionary computationally infeasible.

Semi-trusted Third Parties: Shared Key: In a "shared key" semi-trusted model the participants agree on a secret key with high randomness (entropy) which they do not divulge to the third-party. Each participant uses this key to encrypt the document or construct a hash. For example, each participant may construct a hash using the HMAC-SHA256 standard. The participants only share these hashes with the third-party, as before. However the third party cannot conduct preimage attacks since the hashes are computed using a random secret key that the third-party does not know. This approach requires less trust in the third-party than the other approaches, however the participants are still trusting that the third party does not divulge their hashes to other participants who could conduct preimage attacks (since they do have the shared key).

Peer-to-peer Approaches: Due to security risks and efficiency concerns of a third-party, two participants may engage directly and exchange document hashes. There are several variations of this approach, but generally both participants will send each other their entire list of hashes. Each participant then compares both lists to determine the intersection. This approach is susceptible to the preimage attacks described above, as well as it lacks "forward secrecy", which we describe below.

Information Leakage, Forward Secrecy: In the context of document similarity, a system with forward secrecy means that if a participant retrieves a document at a later point in time (or constructs a preimage attack for a hash) then they should not be able to use this document to determine set membership at an earlier point in time. For example, suppose at time participant P_a sends participant P_b their list of hashes which includes the hash for element E, and P b does not already have element E. At time T+1, P_b does have element E. A system with forward secrecy would prohibit P_b at time T+1 from determining that P_a had element E at time T. Often times applications require forward secrecy to prevent information leakage. For example, suppose at time T participant P_a sends P_b a list of hashes that includes the hash for element E. Then at time T+1, P_a sends P_b another list of hashes that also includes the hash for element E. Suppose P_b does not have element E at time T+1 or time T. Without forward secrecy, P_b can determine that P_a had the same element (element E) at time T and T+1, even though P_b never had E and does not know what E is.

Due to concerns of i) pre-image attacks where a malicious participant may reverse these hashes and ii) forward secrecy requirements, cryptographers have developed "Private Set Intersection" protocols that are not susceptible to preimage attacks and provide forward secrecy.

Private Set Intersection (PSI) Protocols: The "private set intersection" (PSI) problem from the domain of cryptography has developed several approaches and cryptographic protocols that enable 2 parties to privately compute set membership without requiring a trusted third party. See the paper "Phasing: Private Set Intersection using Permutation-based Hashing" by Benny Pinkas et al, USENIX Security 2015 for a detailed description of the current state-of-the-art. These approaches can be classified into 2 categories: i) PSI using custom protocols, ii) PSI as a subproblem of the more general Secure Multiparty Computation (MPC) problem. PSI using Custom Protocols: The first PSI approach involves cryptographers developing new protocols that are specific to solving only the PSI problem. In general this specialized approach has lead to the development of efficient but non-standard protocols. These specialized protocols are brittle in the sense that it is difficult to set the matching similarity rules beyond exact match, or expand the protocol to support more than 2 parties. These approaches typically use modified versions of the Diffie Hellman key exchange or use Oblivious Transfer protocol to enable parties to privately compare hashes of the documents. Many of these protocols use compact, probabilistic data structures to represent lists (see Bloom filters, discussed below) to improve performance, instead of privately comparing lists of hashes directly. These approaches do not readily support multiple parties, nor enable similarity detection beyond exact match.

Secure Multiparty Computation (MPC) for PSI: The second PSI approach uses a general framework that is standardized across a number of cryptographic problems. MPC readily allows several parties to compute an arbitrary computation, where each party's input to the computation is kept private. In this case the inputs to the computation are each participant's set of documents and the computation is computing the query. Although MPC has seen many recent advances, it is still very inefficient in executing even simple computations on moderate data set sizes and small network sizes"'. In practice, MPC is too slow for most real-time applications. Furthermore, MPC is relatively new and uses recent advances in cryptography that are not widely understood. As a result, there only exists a handful of MPC implementations today. MPC protocols are notoriously difficult to implement and validate as secure.

MPC Using Secure Enclaves (Intel SGX): Recent Intel chips include a technology known as Software Guard Extensions (SGX) which augments the existing Intel chip instruction set with additional operations that perform computations privately and secure?. This approach is similar to the ubiquitous Trusted Platform Module (TPM) hardware that is contained in most computers, in that the general idea is to establish a secure piece of hardware that stores private information that cannot be accessed by the rest of the system, including someone with physical access. SGX significantly overhauls the TPM approach in that the chip establishes a secure execution environment known as a "secure enclave" that can execute deterministic computer programs on behalf of the operating system. All data and calculations that is computed within the enclave is encrypted such that it cannot be accessed outside the enclave by either the operating system or the hardware owner. The SGX hardware contains a set of keys signed by Intel that are not externally accessible to perform this encryption. These keys are also used by SGX to sign the results of execution of the program. After executing the program, the operating system receives the computation results along with the signature generated by SGX. The signature is important because it provides "remote attestation", or a proof that a particular program was executed within an SGX secure enclave, and had a particular output. Remote attestation allows someone to execute a program on an untrusted third-party's computer, and be confident that the untrusted third party correctly executed the program'. SGX can be used to execute MPC using the secure enclave'. Here, a client encrypts the inputs to the computer program using an SGX key whose corresponding private key is only stored within the SGX enclave. They also provide their public key as an input to the program. The enclave subsequently decrypts the inputs, performs the calculation, and encrypts the result using the provided client's public key. In addition to remote attestation, this approach allows a client to privately execute a program on an untrusted third-party's computer. Using this same approach, the enclave itself can also generate a private key and encrypt data for private storage outside the enclave, allowing the enclave to have local storage, or state.

Limitations of Secure Enclaves: The secure enclave approach in general, and SGX in particular, hinges on a large trust requirement on the hardware manufacturer's (i.e. Intel) ability to manage the keys and build hardware that actually delivers on the strict confidentiality and integrity requirements (e.g., that this hardware cannot be back hacked or backdoored). Research suggests that building such secure hardware is very difficult, and is not available today. In particular, the infamous Spectre attacks that affected Intel chips early 2018 can also be used to attack SGX enclave and leak private information, which violates these requirements.

Limitations of Existing PSI State-of-the-art: Although some PSI protocols have been extended to provide security even when there are malicious participants that do not follow the protocol specification9, none of them provide consistency guarantees across the execution of multiple rounds of the protocol. Specifically, malicious participants may provide inconsistent answers to their set membership queries without being detected. Suppose participant P_c has an element E. If P_c is malicious then at time T participant P_a may query for element E and P_c includes E in the list during the protocol execution to derive a match. Also at time T, another participant P_b queries for E and participant P_c does not include E in their set. In this way participants P_a and P_b receive inconsistent answers from P_c, without any participant having the ability to detect this behavior in a private way (e.g., without revealing the queries and documents).

In the same way, none of the discussed approaches provide a mechanism of detecting inconsistent queries issued by malicious participants. Specifically, if participant P_c is malicious and has element E then at time T, P_c may issue a query for element E. Also at time T, another participant P_b queries for E and participant P_c excludes E from their list. In other words, P_c violates the constraint that they should only be able to query for documents that are in their list from the perspective of P_b, and this discrepancy is not detected by P_b, or any of the other participants.

Recently, new enterprise applications are building upon Blockchain Architectures to enable untrusted, and possibly malicious, participants to securely execute processes and share private data. We briefly overview the Blockchain Architecture and how it relates to permissioned (private) networks.

In general, a Blockchain is a digital platform that stores and verifies the entire history of transactions between users across the network in a tamper- and revision-proof way. It is also the underlying database structure for digital currency transactions including in the Bitcoin and Ethereum networks. The paper "Bitcoin: A peer-to-peer electronic cash system" (Nakamoto, 2009) is incorporated into this application by reference. Transactions between users or counterparties are broadcast across the network and are verified by cryptographic algorithms and grouped into blocks. Each block is subsequently verified by the network and added to the Blockchain and blocks are cryptographically chained to each other to prevent alteration. For example, each node participating in the Bitcoin network has its own copy of the Blockchain, which is synchronized with other nodes using a peer-to-peer protocol ("Proof of Stake versus Proof of Work", White Paper, Bitfiiry Group Limited, Sep. 13, 2015). This "removes the need for a central authority and thus for participants to have confidence in the integrity of any single entity." ("Innovations in payment technologies and the emergence of digital currencies", Robleh Ali, 2014) Blockchain technology enables multiple organizations and groups within an organization to efficiently process transactions and securely reach consensus without the requirement of a third party ("The Blockchain Revolution: An Analysis of Regulation and Technology Related to Distributed Ledger Technologies", preprint, H. Kakavand, N. Kost De Sevres, Commissioner B. Chilton).

The key blockchain concepts and terminology are as follows:

Blockchain Architecture Blockchain systems typically include components in the following three categories: Blockchain Maintenance (e.g., nodes), Blockchain Interfaces (e.g., clients and oracles), Blockchain Code (e.g., smart contracts). We describe each of these components below.

Transaction: Users submit transactions to nodes using a client. In Bitcoin based technologies, a transaction is a signed message that includes a script which is executed by nodes to transfer value from one address to another. In other blockchains including Ethereum and Hyperledger fabric, a transaction is a signed message used to either deploy a smart contract or send a message to a smart contract which uses the payload to execute a function and update the blockchain state. Nodes validate and disseminate transactions using a peer-to-peer protocol so that every node receives every valid transaction. Transactions are then grouped together in blocks which are also disseminated through the network, validated, and added to the blockchain. A transaction is said to be confirmed if it is included in a block which has been added to the blockchain.

Blockchain Oracles are off-chain services selected by counterparties that are responsible for sending data and commands to on-chain smart contracts. Oracles are a type of Blockchain client that typically creates transactions that update a specific smart contract. Where a smart contract's conditions depend upon real world data (e.g., the price of a commodity future at a given time), agreed-upon outside systems called "oracles" can be developed to monitor and verify prices, performance, or other real world events. For example, the price of an asset at a given time, or the credit default of an entity.

Blockchain Clients are authenticated applications that provide an interface to the blockchain for other applications. In practice, users/counterparties interact with Blockchain clients. The clients deploy smart contracts, create transactions, and query the status of smart contracts on the blockchain. We refer to the "counterparty client" as the "counterparty". Clients create and update smart contracts (see below) by submitting transactions to a node on the network. This node subsequently disseminates the transaction to other nodes on the network for verification. The transaction contains a payload, or data, that is stored on the blockchain and passed as input to a contract for subsequent execution.

On-chain Code, chaincode: Code that is executed entirely on the blockchain. Smart contracts are written in chaincode which is a programming language that is supported by the Blockchain architecture. For example, Hyperledger fabric supports the execution of chaincode written in Go. Chaincode is deployed to the blockchain by a client. This means that the client creates a special deploy transaction that includes the chaincode as its payload. This deploy transaction is stored on the blockchain and subsequently downloaded by all of the nodes for execution. A unique ID is generated for each deployed smart contract which is used by clients to create transactions. Specifically, clients create transactions with payloads, or data, that are sent to the smart contract using this ID. This code is written in a smart contract language such as Solidity in Ethereum or chaincode (Go) in Hyperledger fabric. Each node runs the on chain code to validate transactions and maintain the integrity of the blockchain. A smart contract reads and writes data that is stored on the blockchain during its execution. This reading and writing of blockchain data by the smart contract is known as on-chain execution. These data are the values of all of the variables within the chaincode and are known as the contract's state. All inputs to the smart contract and outputs must exist on the blockchain. This requirement, along with the contract's chaincode, allows every node in the network to consistently execute each step of the contract and compute the same new state. The nodes then reach consensus on the contract's new state.

Off-chain Code: Code that is executed entirely off the blockchain. In other words, code that is not "on chain code".

Query: Clients can send query messages to a node to lookup the information stored on the blockchain. For example, a client can issue a query to retrieve the latest state associated with a smart contract. The node does not necessarily need to communicate with other nodes to answer this query, in some cases it can use its own locally maintained blockchain that is synchronized with the network to retrieve the requested state.

Node: A Blockchain is maintained by software that runs on a computer called a node or peer. Each node is connected to the Blockchain network and can submit and receive transactions. Each node participating in the Bitcoin network, for example, has its own copy of the Blockchain, which is synchronized with other nodes using a peer-to-peer protocol. Organizations and possibly individuals maintain nodes. These nodes run Blockchain software to communicate with each other and form a Blockchain network.

Network: Organizations and possibly individuals maintain computer systems called nodes, these nodes run Blockchain software to communicate with each other and form a Blockchain network.

Submit Transaction: Users submit transactions to the Blockchain by using a client that sends them to nodes on the network who subsequently disseminate them to all other nodes on the network.

Transaction Validation: Nodes on the Blockchain network receive, process and cryptographically validate each transaction. The network ignores invalid transactions.

Blocks: Nodes collect and group valid transactions together into a bundle known as a block. Blocks must follow a predetermined set of rules for them to be valid. For example, they must not exceed a maximum size in bytes, contain more than a maximum number of transactions, and must reference the most recent valid block. Nodes validate a block and its transactions and then run a consensus protocol to agree on the latest block.

Blockchain: Each new block contains a reference to the most recent valid block and is attached to that block. I.e., it is placed after that block in the database, forming a "chain of blocks". In distributed systems, multiple processes communicate to enable system operation. It is possible for faults to occur anywhere throughout a distributed system, for example processes may crash or adversaries may send malicious messages to processes. Distributed systems use consensus protocols to achieve reliability despite faults. Processes execute a consensus protocol so that they reach agreement within a certain period of time. For example, in Bitcoin, nodes execute a proof-of-work consensus protocol to reach agreement on the next valid block and blocks are generated roughly every 10 minutes. An adversary who injects malicious data into the system can trigger faults known as "Byzantine faults" where multiple processes receive conflicting information. Byzantine Fault Tolerance (BFT) refers to consensus protocols that achieve consensus in systems with Byzantine faults. BFT is a well understood distributed systems problem within computer science and implementations have existed for several decades (Lamport, Leslie, Robert Shostak, and Marshall Pease. "The Byzantine generals problem." ACM Transactions on Programming Languages and Systems, 1982).

Smart contracts are computer protocols that facilitate, verify, or enforce the negotiation or performance of a contract, or that make a contractual clause unnecessary. Smart contracts usually also have a user interface and often emulate the logic of contractual clauses. To develop a smart contract, parts of the terms that make up a traditional contract are implemented in software code and uploaded to the Blockchain, producing a decentralized smart contract that does not rely on a third party for recordkeeping or enforcement. Contractual clauses are automatically executed when pre-programed conditions are satisfied. This eliminates ambiguity regarding the terms of the agreement and disagreement concerning the existence of external dependencies, (see: "The Blockchain Revolution: An Analysis of Regulation and Technology Related to Distributed Ledger Technologies", preprint, H. Kakavand, N. Kost DeSevres, Commissioner B. Chilton.)

Validators maintain the integrity of the blockchain and use new transactions to execute smart contracts. Blocks contain data including a set of transactions, a reference to the previous block, and a "state hash" which is the result of each smart contract executing its relevant transactions as described in detail below. Peers disseminate blocks to one another and use a consensus protocol (e.g., PBFT, or Nakamoto consensus (Bitcoin: A Peer-to-Peer Electronic Cash System, Satoshi Nakamoto 2008)) to reach agreement as to which block to add to the top of the blockchain. Only valid blocks are accepted and added to the blockchain data structure after the network has reached consensus.

State is the data, or values of the variables, stored within a smart contract. Validator nodes maintain the blockchain data structure which contains transactions and their payloads. When a smart contract is deployed it is assigned a unique ID and every validator begins executing it locally. When a node receives a new block it takes the transactions and uses the ID to pass them to the relevant running smart contract for execution. The result of this execution is that the smart contract updates its local variables, or state. A state hash is a hash over all of the variables across all of the running smart contracts. Each block includes a state hash which is the result of hashing the entire "world" state after executing all of the transactions within that block.

The state hash contained within the block is compared against the state hash computed by each validator to ensure that consensus is reached on the execution of the block's transactions. In this way, although the state hash is included directly within the blockchain data structure, the contract state itself is not stored in the blockchain data structure per se—it is a function of applying the transactions to the running smart contracts. The actual state values are available at any time by using a blockchain client. The client sends a query message with a specified contract ID to a node who then relays this request to the running smart contract. The node then relays the response to the client.

Blockchain technology offers solutions for the inefficiencies in the management of business processes and transactions. Blockchain technology can provide the following benefits when applied to business processes and transactions.

Increased Security & Lower Security Tech Costs: Blockchain architectures combine modern cryptography and distributed systems to maintain an immutable ledger. Removing intermediaries lowers potential security concerns from hacking to corruption resulting in lowered security costs.

Reduced Technology Integration & Resources Costs: Permissioned or permission-less ledgers as infrastructure can be shared across multiple institutions and reusable across various asset classes. Human-in-the-loop processes are automated/optimized as smart contracts which reduce resource costs.

Blockchain technology strengthens trust-based contracts by adding rules that are defined and enforced programmatically (Pilkington, Marc, "Blockchain Technology: Principles and Applications," page 15 (citing Kwon, J. (2014). Tendermint: Consensus without Mining. White paper.). Three key technical benefits provided by most blockchain platforms are the following: Decentralization: Peer-to-peer blockchain protocols enable counterparties to engage in contracts without requiring trust in each other or a trusted third party. In some applications the function of a trusted intermediary can be replaced by a blockchain network. Disintermediation through decentralization can reduce costs and improve operating efficiency. E.g., through reduced settlement times.

Immutable Transaction Log: Blockchain protocols use modern cryptography to maintain a distributed ledger that records every transaction in a tamper-proof way. Every node within the network stores the entire ledger with timestamps. This facilitates detection of contract execution errors, node failures and malicious tampering.

Standardized Contract Execution Platform: Blockchain offers a shared infrastructure for smart contract execution for an enterprise consortium. Standardization of smart contract templates and their execution can reduce operating costs by easing cross-organizational interoperability for multiple asset classes. In some cases compliance logic can be added to the smart contract which further reduces auditing costs.

Hash Function: A hash function is a one-way function that maps an input of arbitrary size to a fixed size output called a hash. A cryptographic hash function is a hash function that includes the properties (i) easy to generate the hash given the input, (ii) infeasible to generate the original input given the hash, (iii) virtually impossible for two similar inputs to have the same output in a so called "collision". SHA256 is an example cryptographic hash function that is used in the Bitcoin and Ethereum Blockchain networks.

A merkle tree is a tree data structure in which every non-leaf node is labelled with the hash of the labels or values (in case of leaves) of its child nodes.

In practice nodes do not directly reach consensus on the contract's state, but instead reach consensus on a summary of the state known as the state hash. The state hash itself may be contained within a merkle tree which is a summary of the execution of multiple smart contracts. A state hash is a hash over all of the current values of the variables contained within a smart contract. It represents a "snapshot" of the contract's state at a specific point in time. If two nodes compute the same state hash then they know they are in agreement on the contract's execution.

An important motivation for executing a smart contract on a blockchain is to ensure that all of the counterparties agree on the history and current state of the contract in a non-repudiable way. Nonrepudiation means that the counterparties make a commitment towards their agreement that is permanent and undeniable. In the event that the counterparties disagree on the state of the agreement, they can undeniably identify the same exact moment where their smart contract execution diverged, greatly simplifying resolution or arbitration.

A person of ordinary skill in the art in the field of this system and method is familiar with permissioned blockchain architectures such as Hyperledger fabric (http://www.hyperledger.org).

Hash function Preimage Attacks: If the domain of inputs to a hash function is small enough, then even a cryptographic hash may be vulnerable to a preimage attack. In a preimage attack, the attacker determines the original document (known as the preimage), given just the hash. Due to the randomness of the hash, typically this requires the attacker to use a brute force method (e.g., password cracking) whereby they systematically try every possible input preimage) to the hash function and check if it matches the hash they are attacking. In some cases the attacker attempts to break multiple hashes at the same time, in which case after generating a hash they compare it against all of those in the list of hashes that they are breaking. Attackers may use already existing dictionaries known as "rainbow tables" that map common words to a typical hash function output (e.g., MD5), which allows them to quickly lookup the pre-image without having to compute the hash function. To combat brute force attacks, systems often employ a "salt" which is a random string of characters that is associated with each hashed data. The salt is included in the hash, which both i) prevents the hacker from using rainbow tables, and prevents the attacker from breaking multiple hashes at the same time.

Slow Hash Functions: Although salts prevent some attacks, the large increase in available computation to attackers has lead to the development of hash functions that are computationally difficult to compute by design. The rationale behind these "slow" hash functions is that it requires the attacker in infeasible amount of time or computation resources to successfully conduct a brute force attack. Bcrypt and Scrypt are example hashing functions that are designed to be slow, to prevent brute force attacks. Both of these functions support an adjustable difficulty parameter that allows the system designer to increase the difficulty of computing the hash as more computational resources become available to the attacker. Bcrypt is built on the Blowfish encryption cipher, while Scrypt builds on password-based Key Derivation Functions (KDF). KDF have similar security properties to cryptographic hash functions, but are computationally expensive to compute.

Efficient Data Structures and Algorithms for Set Membership: Bloom filters (Bloom, "Space/time Trade-offs in Hash Coding with Allowable Error," 1970) are a probabilistic data structure and algorithm (an abstract data type) that efficiently solve the set membership problem. The set membership problem is to determine whether an element is or is not within a set (e.g., to correctly answer a set membership query). Bloom filters require less space than storing the entire set and can answer membership queries faster than most alternative data structures. Bloom filters quickly check if a member is or is not within the set. The Bloom filter is probabilistic and is designed to return a true negative answer with 100% probability, however there is a slight probability of false positive. Due to this probability, if there is a query match then an additional verification step is necessary to confirm that the element is truly in the set. Bloom filters include a data structure that is a vector of bits known as a bitmask that is of fixed size, m. Bloom filters also have k hash functions that map elements to an integer in range [0, m-1]. Bloom filters support 2 operations: i) insert element, ii) membership query element. When an element is inserted into the Bloom filter the k hash functions are applied to the element to construct k indices (some of these indices may be duplicates). The bitmask is then updated so that the bits at each of the k indices in the bitmask are set to 1. To query an element, the element is again hashed using the k hash functions to construct the k indices. If there is a 0 in the bitmask for one of the k indices then the element was not previously inserted in the Bloom filter (e.g., the element is not in the set). Otherwise, the element may have been inserted into the Bloom filter with a probability p. Using asymptotic notation, insertions and queries are constant O(k), where the k hash functions can be computed in parallel. The parameters k and m are determined by a formula that computes optimal values for these parameters given p and n, where n is a number of elements in the set. Specifically, the formula, $$m = \text{ceil}((n^* \log(p))/\log(1.0/(\text{pow}(2.0, \log(2.0)))))$$

$$k = \text{round}(\log(2.0) * m/n)$$

For example, for a set with n=40,000,000 members and a false positive probability p=1.0e-6 then the bitmask calculated to be of size m=137.12 MB and k=20. Note that if the list consists of 32 byte hashes, then this list is—1.19 GB, or —8.7× larger in size.

Counting Bloom Filters: Bloom filters do not provide an operation to remove elements. Counting Bloom filters (Fan et. al., "Summary Cache: A Scalable Wide-Area Web Cache Sharing Protocol", 1998) are an extension of Bloom filters to support element removal. Each bit in the bit mask is replaced with a counter consisting of c bits. On insertion, the counters at the k indices are incremented by 1. On removal, the counters at the k indices are decremented by 1. On a membership query, the counters at the k indices must all be greater than 0 to indicate membership, and the element is not in the set otherwise. The parameter c must be set high enough to avoid arithmetic overflow in the counters.

There are a number of variants and extensions of Bloom filters that are optimized for different applications and support additional functionality (e.g., dynamic bitmask sizes, filter aggregation, etc.)

Text normalization is the process of converting text into a single canonical representation that may be different from the original text. For example, a text name field that has a value "Sam  Wood" may go through a normalization process by which the duplicate spaces are removed to from the canonical text "Sam Wood". Note that multiple values may map to a single canonical form, for example "Sam Wood" and "Sam  Wood" both normalizing to "Sam Wood" using the process described above. As part of normalization processes, phonetic algorithms may be employed that generate a canonical form based on the phonetics (sounds and pronunciation) of the word. Phonetic algorithms are advantageous because it enables matching of words that have the same pronunciation but different (possibly misspelled) spellings. For example, a phonetic algorithm may map the name "Bryan" and "Brian" to the same canonical representation. The Soundex algorithm is a popular algorithm that performs a phonetic normalization that has been successfully applied to English surname matching. For example, the Soundex algorithm maps both "Robert" and "Rupert" return the same string "R163", while "Rubin" yields "R150". Some popular database technologies such as MySQL support phonetic matching. Double Metaphone is another phonetic algorithm that performs a similar canonization, but can also support non-Latin characters and can additionally generate two canonical representations (a primary and secondary form) for a single word, to improve matching.

What is needed is a system that provides multiple participants, each with a private document repository, connection to a shared network, where the network detects similar documents across all of the repositories in an efficient, secure, and private way. The private repositories can be large and similar documents must be detected fast. The system must be secure and prevent malicious participants from determining the contents of other participant's repositories, and prevent malicious participants from interfering with the similarity detection process.

BRIEF DESCRIPTION OF THE DRAWINGS

For a more complete understanding of the invention, reference is made to the following description and accompanying drawings, in which:

FIG. 7 illustrates pseudocode for a process that runs on a private document repository server to construct the signatures (hashes) from a normalized claim private document;

FIG. 8 illustrates pseudocode for a process that is executed by a Smart Contract to store the signatures (hashes) on the Blockchain and perform duplicate signature detection; and FIG. 9 Illustrates pseudocode for a process that is executed by a Smart Contract to remove expired signatures (hashes).

DETAILED DESCRIPTION OF ONE OR MORE EMBODIMENTS

The disclosure is particularly applicable to detecting similarly in medically related documents using the disclosed embodiments of the system and method and it is in this context that the disclosure will be described. It will be appreciated, however, that the system and method has greater utility since it can be used to detect similarities securely for any document repository and any kind of document in any area of focus in addition to the illustrative medically related documents described below.

The disclosure provides a system and method to detect similar documents across multiple participants' private repositories. The system and method may use a similarity metric to detect similar documents. The system and method may only allow participants to search for documents similar to those that they already have. In one embodiment, the system and method enables a first participant to determine if a particular document in their private repository is contained within, or is similar to, a document that is within a private repository belonging to a second participant; i) without the first participant learning anything about the contents of the second participant's private repository; and ii) without the second participant learning anything about the first participant's document or their private repository; and iii) without the requirement of a trusted third party. The system and method may prevent a first participant from viewing a document similarity query issued by a second participant and prevent a third participant from viewing document queries issued by a first participant against a second participant's private repository. The system and method may also detect malicious or misbehaving participants on the document repository network. In one embodiment, the system and method may disallow documents older than a specific age from being eligible for similarity detection. The system and method may also be able to quickly detect if a private document is similar to another private document across several large document repositories. The system and method accordingly comprises the several steps and the relation of one or more of such steps with respect to each of the others, and the apparatus embodying features of construction, combinations of elements and arrangement of parts that are adapted to affect such steps, all is exemplified in the following detailed disclosure.

Figure 1A:
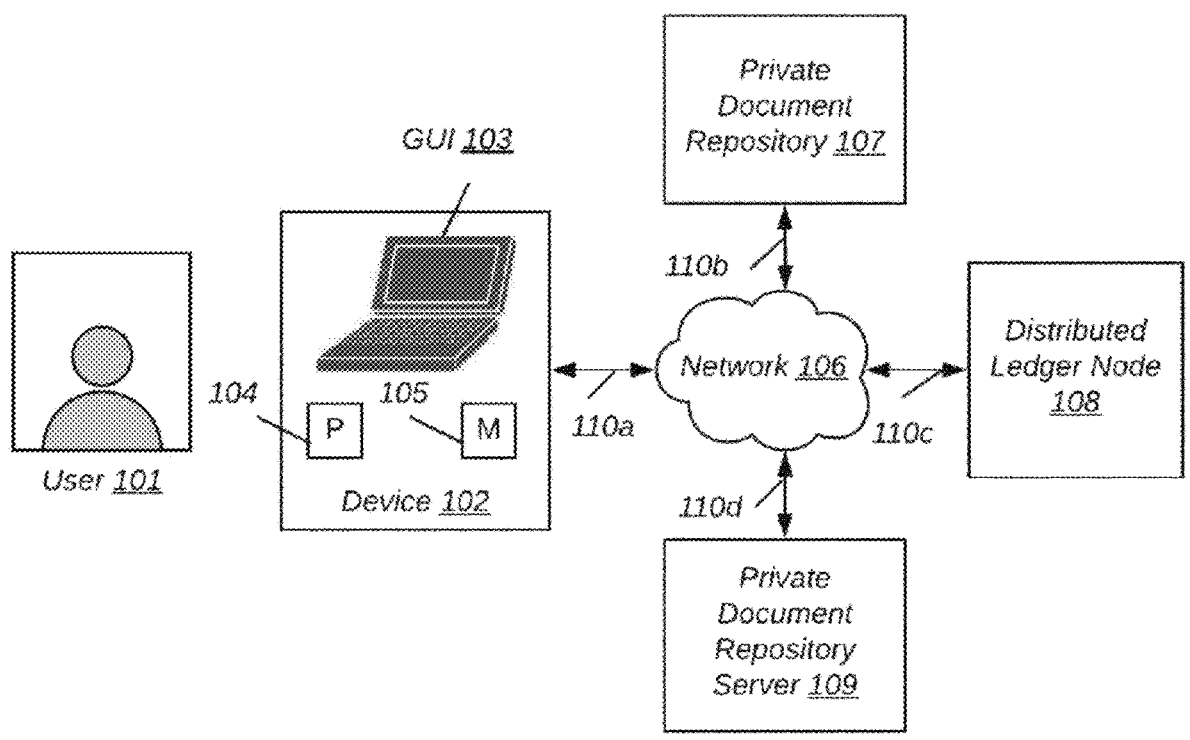
FIG. 1A illustrates an example secure private document repository environment.
Figure 1B:
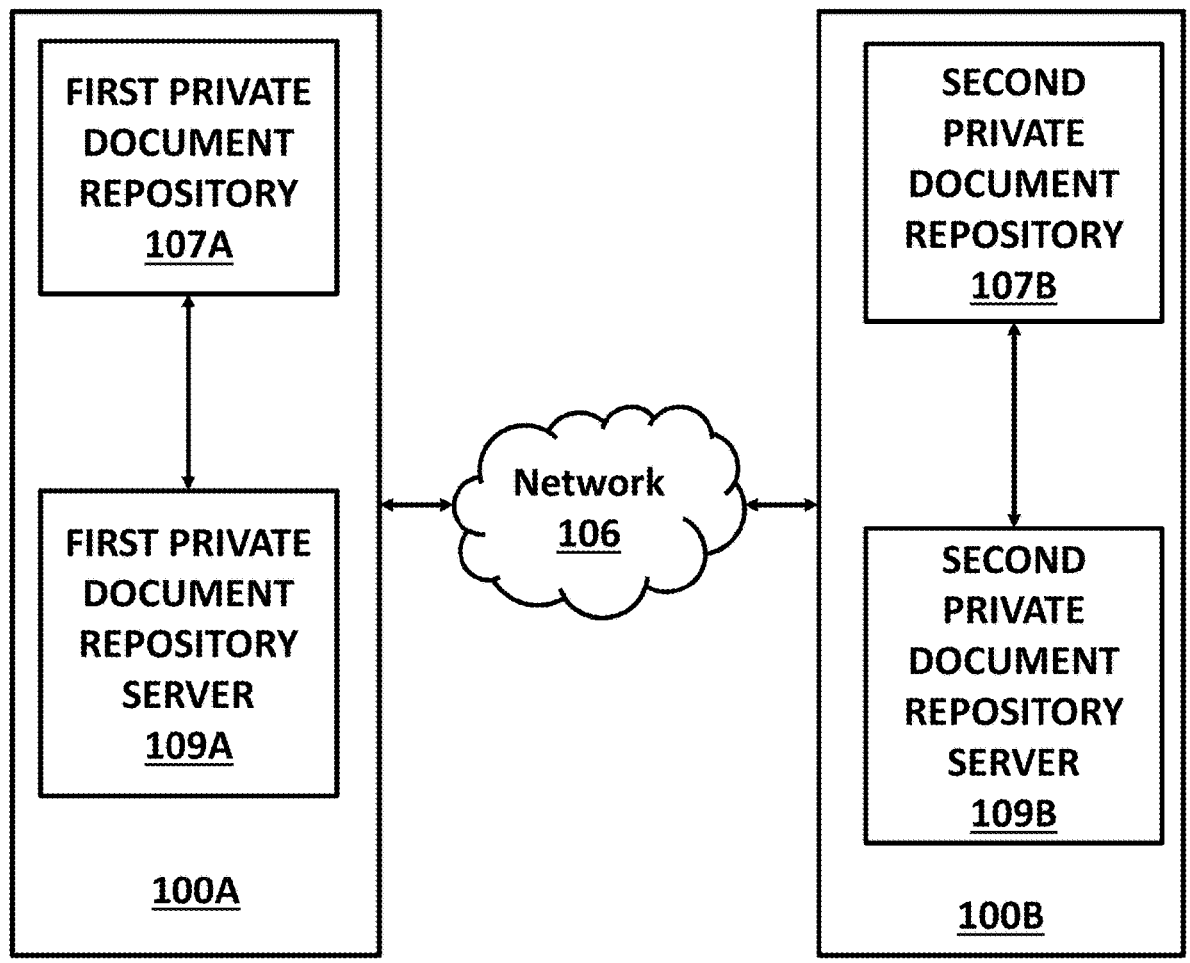
FIG. 1B illustrates an embodiment with two secure private document repository environments.

FIG. 1A illustrates an example secure private document repository environment 100 and FIG. 1B illustrates an embodiment with two secure private document repository environments. As shown in FIG. 1A, the environment 100 conducts private document similarity matching functions and allows users to submit documents and view the duplicate statuses of their documents. A user 101 interacts with a GUI 103 using a device 102 that includes at least a processor 104 and memory 105. For example, an employee at an insurance company uses a browser on his laptop to access a web portal that displays insurance claims. The device 102 connects to a network 106 over an interface 110a to access and manage private document repository server, or server, 109 that is connected to the network 106 using an interface 110d. The server 109 communicates with a private document repository 107 that is connected to the network 106 over an interface 110b, and communicates with a distributed ledger node 108 that is connected to the network 106 over an interface 110c. Within an environment 100 there are possibly multiple users 101, devices 102, servers 109, repositories 107, and distributed ledger nodes 108, connected over a single network 106. In some embodiments, users belong to one or more organizations, for example insurance companies, and operate and manage the components in the environment 100 on behalf of their respective organizations.

In a preferred embodiment, there are multiple environments 100 connected over a single network 106. For example insurance company A manages a first environment, insurance company B manages a second environment, and the first environment and second environment are interconnected to a common network 106. In some embodiments, the device 102, private document repository 107, and private document repository server 109, are physically located on the premises of an organization; and the distributed ledger node 108 is physically located on the premises of a Cloud infrastructure provider. In some embodiments, the device 102, private document repository 107, private document repository server 109, and distributed ledger node 108, are physically located on the premises of an organization. In some embodiments, the device 102, private document repository 107, private document repository server 109, and distributed ledger node 108, are physically located on the premises of a Cloud infrastructure provider.

The distributed ledger node, or node, 108 communicates with possibly multiple other distributed ledger nodes via an interface 110c and network 106. The node is responsible for providing an execution environment for Smart Contracts, and establishing a Blockchain network that coordinates this execution. In a preferred embodiment, the nodes coordinate the execution of Smart Contracts that run workflows illustrated in FIG. 5, and FIG. 6.

As shown in FIG. 1B, in an embodiment with two environments 100A, 100B, the first environment 100A and the second environment 100B may be connected to each other by the network 106. Each of the environments has all of the same elements as shown in FIG. 1A as well as the separate document repositories and document repository servers as shown in FIG. 1B. The first environment 100A may have a first private document repository 107A that stores private documents 414a, 414b (shown in FIG. 4) belonging to a user 101. These documents are loaded and processed by a first Private Document Server 109A to determine whether the document is similar to, or a duplicate of, another document that exists within a second private document server 107B that is part of the second environment 100B. Each private document repository 107A, 107B communicates with its respective private document repository server 109A, 109B by connecting to network 106 via an interface 110b as shown in FIG. 1A.

Figure 3:
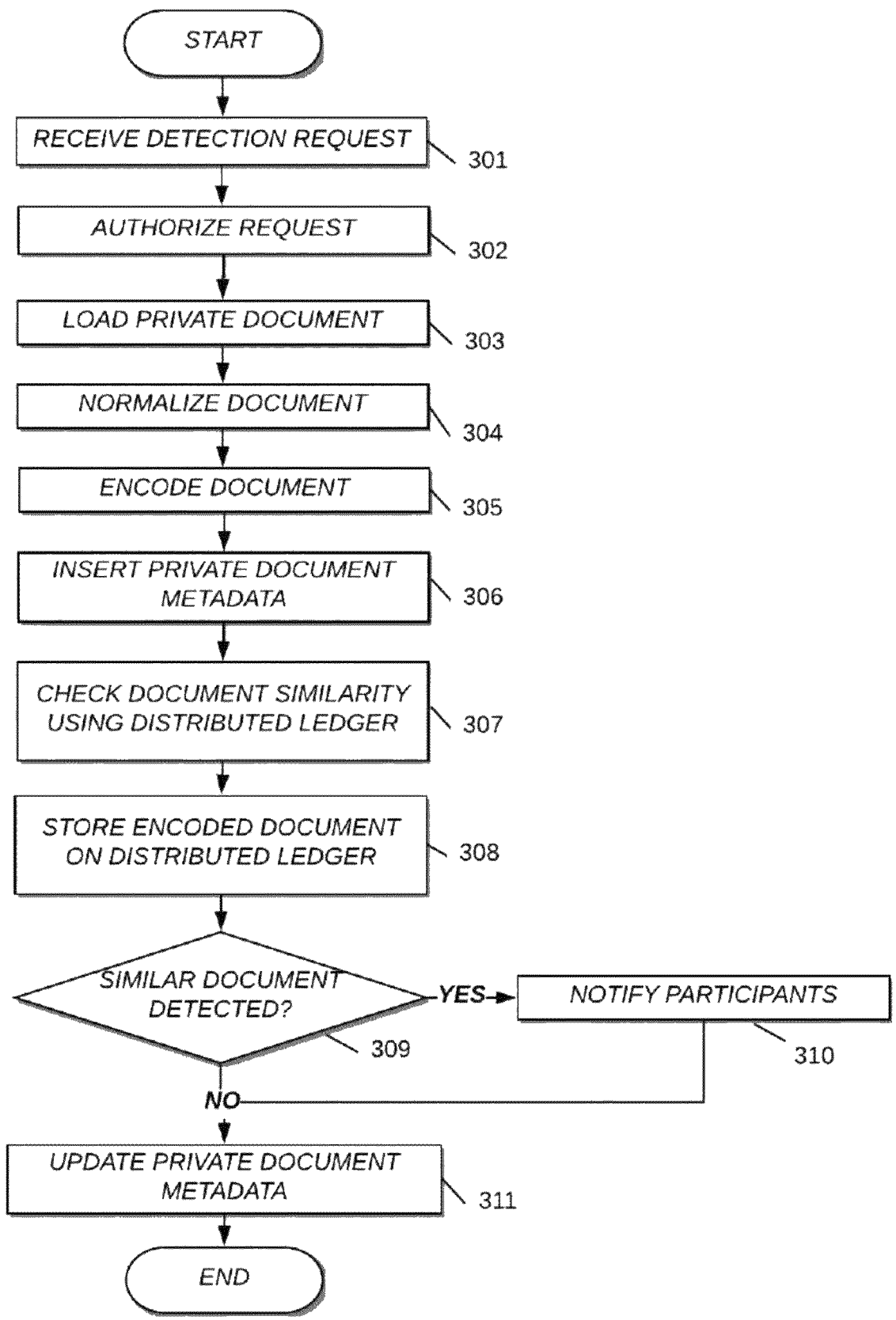
FIG. 3 illustrates an example flowchart for facilitating private document similarity detection.

Returning to FIG. 1A, in a preferred embodiment, this processing of the private document 414a, 414b by the document server 109 is executed using the series of steps illustrated in FIG. 3. In some embodiments, the private document server 107 is implemented as a Relational Database Management System (RDMS), and private documents 414a, 414b are records stored in that RDMS.

Figure 2:
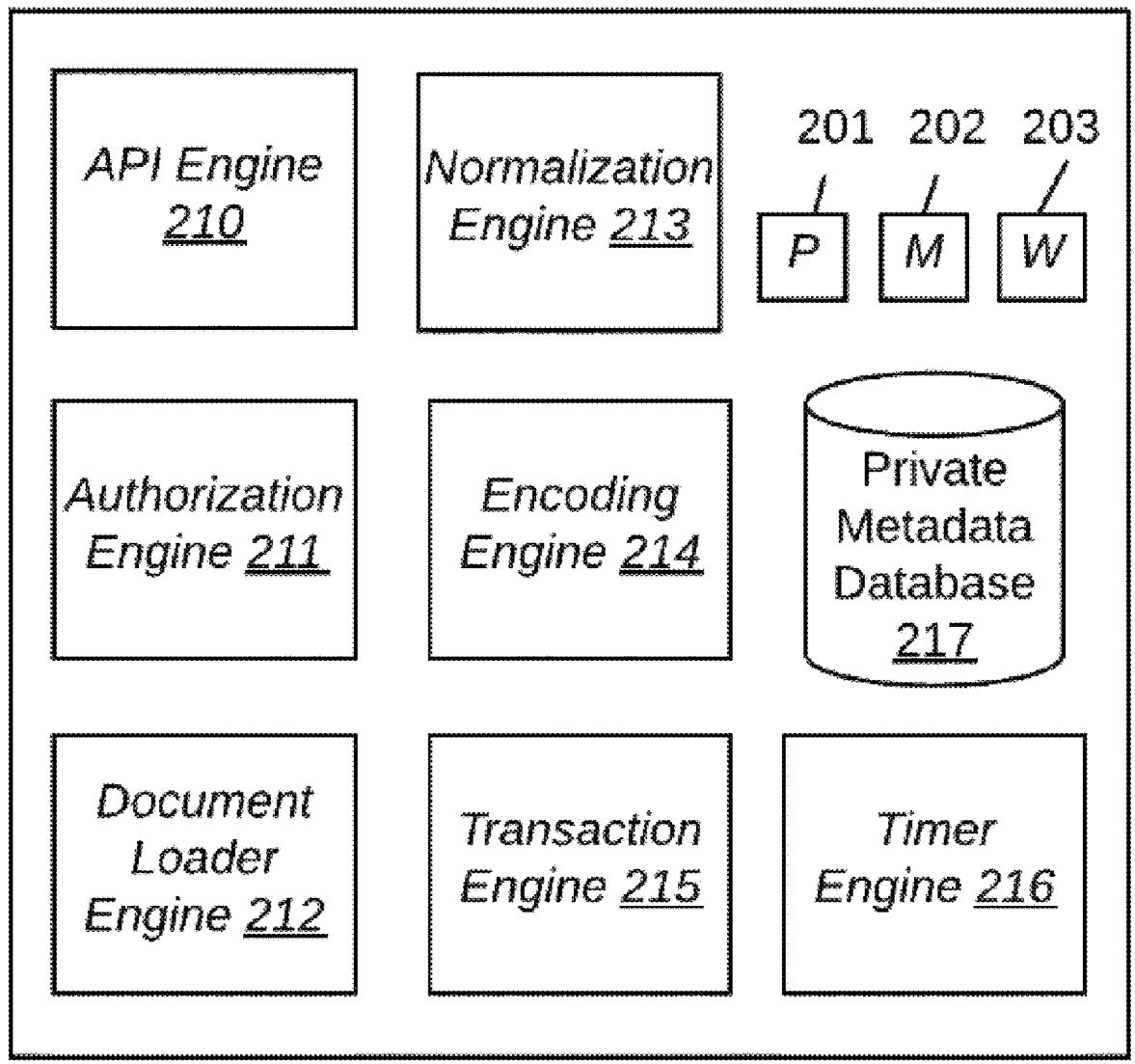
FIG. 2 illustrates an example private document repository server and its components.

FIG. 2. illustrates an example private document repository server, or server, and its components. The private document repository server 109 consists of at least a processor 201, memory 202, and private keys stored in a wallet 203. In one embodiment, each of the elements 210-217 shown in FIG. 2 may be implemented on one or more computer systems wherein each engine shown in FIG. 2 is a plurality of lines of instructions/computer code that that are hosted by a computer system and executed by a processor 201 of the computer system to perform the operations and processes as described below. Furthermore, the distributed ledger node 108 may be implemented on a computer system in which the distributed ledger node 108 is a plurality of lines of instructions/computer code that that are hosted by a computer system and executed by a processor of the computer system to perform the operations and processes as described below. The server communicates with the distributed ledger node 108, private document repository 107, and device 102, to submit a user's 101 documents contained in a private document repository 107 for duplication detection, and store the duplication status of submitted documents. In some embodiments, the private document repository server 109 consists of a number of services that intercommunicate over a network.

The API (Application Programming Interface) Engine 210 receives request messages issued by the device 102 and private document repository 107. The message either requests the similarity detection status of one or more documents, or requests that a document is to undergo similarity detection 301, for example by triggering the server 109 to initiate the steps illustrated in FIG. 3. The API engine 210 verifies that the received messages conform to a predetermined message format, and returns an error to the message issuer if this validation fails. If the API engine 210 receives a request for the similarity detection status of previously submitted documents, then the API engine 210 will make a request to the private metadata database 217 to lookup this status. The metadata database 217 stores results of prior similarity detection comparisons of documents submitted by that organization (process 311 shown in FIG. 3). In some embodiments, the API Engine is implemented using an HTTP server that exposes both a REST/JSON interface and a SOAP/XML interface.

The Authorization Engine 211 receives requests from the API Engine 210 and determines whether or not the request is authorized and can subsequently be processed 302. As part of this determination, the Authorization Engine 211 examines both data about the authenticated issuer of the request, and the type of request. In some embodiments, the Authorization Engine 211 inspects a role included in a JSON Web Token (JWT) generated by the device 102 on behalf of the user 101, to determine whether the user 101 has the necessary permissions to issue the request.

The Document Loader Engine 212 loads (process 303 shown in FIG. 3) private documents 414a, 414b provided by a first private document repository 107A so that they can subsequently be processed to determine if they are similar to documents stored in the second private document repository 107B. The Document Loader Engine 212 validates the document by checking if the document conforms to a predetermined document format. In some embodiments, the document loader engine 212 uses an RDBMS connection to directly access a private document repository 107 implemented an RDBMS. The document is a record in the RDBMS, and the Document Loader Engine 212 validates that the record conforms to a predetermined schema.

In some embodiments, the document loader engine 212 receives the document via the API Engine 210. The API engine 210 receives a message sent from the private document repository 107 that includes the private document. In some embodiments, the document loader engine 212 notifies the user 101 via the API Engine 210 if the document fails validation.

The Normalization Engine 213 processes 304 private documents 414a, 414b provided by the Document Loader Engine 212 to construct a new document that is subsequently encoded by the Encoding Engine 214. The Normalization Engine 213 extracts values from fields contained within the private documents 414a, 414b and translates those values into new values. In a preferred embodiment, a normalization engine 213 performs text normalization that is specific to the field. For example, date fields are translated into the RFC3339 date format standard, non-ascii characters are removed, all characters are converted to their uppercase equivalents. In a preferred embodiment, the normalization engine 213 performs text matching of certain fields to a predetermined list of known field values. For example, a private document 414a, 414b represents a motor insurance claim that includes a "vehicle body part name" field. In this case, the normalization engine 414b matches the vehicle body part name to a name stored in a predetermined list of known vehicle body part names, known to the server 109. This matching may use phrase matching, fuzzy matching, spell checking, and phonetic matching, technology to match to the closest name in a list, corpus, or dictionary, for example using the Levenshtein distance algorithm to find the nearest neighbor. In some embodiments, the normalization engine translates a private document into several private documents, for subsequent processing. For example, a phonetic matching algorithm may translate a person's name into 2 canonical representations using the Double Metaphone algorithm. The normalization engine then creates two private documents for subsequent encoding, one for each canonical phonetic representation which is included in the new document. In some embodiments, the normalization engine adds fields and values to the translated private document, where these fields and values did not exist in the original private document. For example, the engine may receive private documents with a "name" field that includes both a person's first name and last name. The engine may subsequently remove the "name" field and add new fields "first name" and "last name". The new fields are then populated by extracting the first name and last name from the single "name" field. In some embodiments, the normalization engine learns to normalize fields by observing past entries and their associated corrected fields. For example, a machine learning approach may use a name classifier with supervised learning to determine how to split a name field into a first name field and last name field.

The Encoding Engine 214 processes 305 documents that have been normalized by the normalization engine 213, to construct a set of encoded signatures for each private document. The input to the encoding engine is a document, and the output is a set of encoded signatures. Meaning there are 1 or more encoded signatures for each document. The exact number of signatures is dependent on the configured application, for example in the below insurance medical claim application there are 36 signatures. Each signature is computed using the algorithm described below. To summarize that algorithm, to calculate an individual signature, the algorithm applies a hash function (SHA1) over each <field name, field value> (field) pair, selects a fixed-sized subset from these pairs, and then applies a different hash function (scrypt) over the combination of this subset, to output that specific signature. Immutable field-pairs are included in every subset, while mutable field-pairs are omitted in some combinations. In the case where there are only immutable fields, then a single signature is generated. The encoding engine 214 passes these signatures to the transaction engine 215, to store them 406a, 406b on the distributed ledger 401. The encoding engine 214 uses an encoding process to generate the signatures such that given a signature it is computationally infeasible or prohibitively expensive to construct the original private document, using current hardware. In a preferred embodiment, the encoding engine generates multiple signatures for a normalized document, where the signatures are computed by applying multiple hash functions, including slow hash functions, over combinations of fields from the normalized document. In a preferred embodiment, an environment used to detect duplicate insurance medical claims has claims which contains ten fields: 1) "Social Security Number", 2) "Patient First Name", 3) "Patient Last Name", 4) "Consultation Date", 5) "Admission Date", 6) "Discharge Date", 7) "Doctor First Name", 8) "Doctor Last Name", 9) "Hospital Name", 10) "Insurance Code". Some fields are modifiable and others are not (immutable) when detecting duplicate claims. Specifically, "Social Security Number" is immutable in that if two claims do not share a Social Security Number then they are not considered as duplicates. All other fields are mutable. The claim duplication application defines two claims as duplicates if and only if they share a common Social Security number value, and at least c=7 of the n=9 mutable field values in common. As depicted in the pseudocode illustrated in FIG. 7, for each field in a claim "f^i" with name "f^i_k" with value "f^i_v", the encoding engine 214 generates an initial hash "f^i_h" which is the SHA1 hash of the field name concatenated with the field value for that claim, or "f^i_h=SHA1(f^i_k+f^i_v)".

The encoding engine then constructs "Choose(n, c)=36" signatures "s_1, ..., s_36" by concatenating combinations of the Social Security number (immutable fields) hash "f^i_h" with every set of the mutable field hashes of size c=7, and applying a slow hash Scrypt over each of these concatenations. Specifically, "s^j=Scrypt(f^i_h+S_k)" where "S_k" is the concatenation of c=7 mutable initial hashes "f^m)_h+f^i_h+ ... " for the "k"-th set from the set of all mutable fields of size c=7. The encoding engine 214 then passes this set of hashes (signatures) to the transaction engine 215 for placement on the distributed ledger as signatures 406a, 406b. In another preferred embodiment, the pseudocode illustrated in FIG. 7. is utilized to construct the signatures (hashes) from the normalized document, where there are no immutable fields. In another preferred embodiment, the pseudocode illustrated in FIG. 7. is utilized to construct the signatures (hashes) from the normalized document, where there are no mutable fields. In the case where there are no immutable fields, then the same algorithm as described above is applied, but the immutable field hash "f^i_h" is excluded from Scrypt hash over the field hashes, i.e. "s^j=Scrypt(S_k)". In the case where there are no mutable field, then the same algorithm is applied, but the mutable field hashes are excluded from the Scrypt hash, i.e. "s^j=Scrypt(f^i_h)", which results in a single signature for the document.

The Transaction Engine 215 constructs distributed ledger transactions 405a, 405b, submits them to one or more distributed ledger nodes 108, and processes the results of the network executing this transaction. Specifically, it receives a set of signatures from the encoding engine 214 and the private document, and inserts a first record into 306 the Private Metadata Database 217 that contains the private document fields, along with transaction status that is set to "pending". The transaction engine 215 uses a distributed ledger client to construct a distributed ledger transaction 405a, 405b that includes these signatures 406a, 406b within the transaction 405a, 405b payload. The transaction engine then submits the transaction to one or more distributed ledger nodes 108 that run a Smart Contract that receives this transaction 501 and execute the workflow illustrated in FIG. 5. to detect similar documents 307 and store the signatures on the ledger (process 308 in FIG. 3). The transaction is validated and confirmed by the network of distributed ledger nodes 108 and is placed in a block 402a, 402b on the distributed ledger 401.

Figure 4:
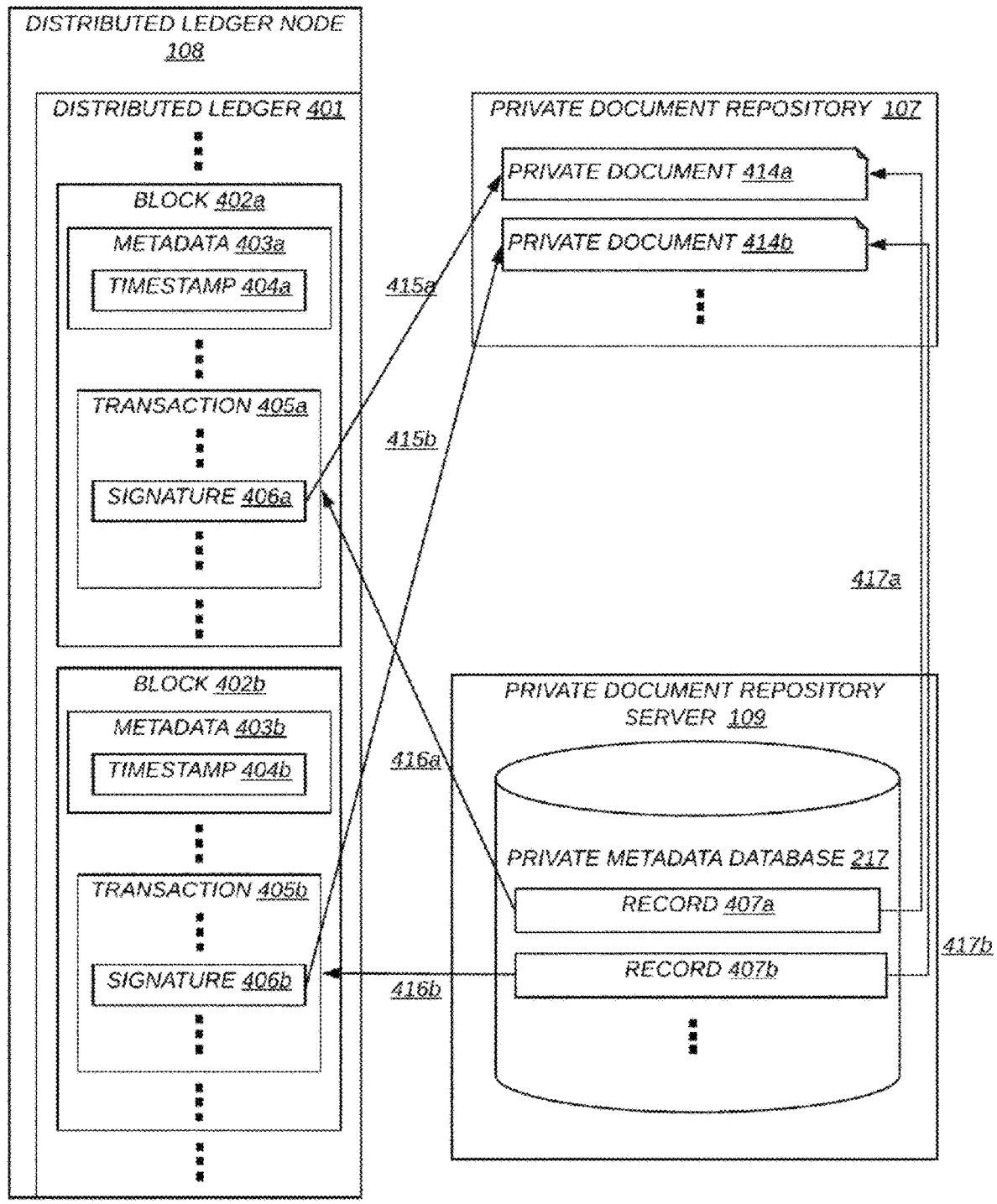
FIG. 4 illustrates an example private document repository storage arrangement.

The block 402a contains metadata 403a, 403b associated with the transactions, along with a timestamp 404a which denotes when the block 402a was created. Note that each of the signatures 406a, 406b on the distributed ledger 401 refer to 415a, 415b private documents 414a, 414b. The transaction engine 215 receives a corresponding first response generated by the Smart Contract 511 which includes a similarity detection status that indicates whether the network determined that the original private document 414a was similar to another private document 414b. The transaction engine 215 updates (process 311 shown in FIG. 3) the first record in the private metadata database 217 to include the similarity detection status from the first response. If an error occurred as part of the transaction processing by the smart contract, then the first record in the private metadata database 217 is updated to include this error. The transaction engine 215 updates the first record to include the transaction ID which is a reference 416a, 416b to the corresponding transaction for that record 407a, 407b on the distributed ledger 401. FIG. 4. illustrates the records and their relations to each other, after the above steps are complete. In response to the timer engine 216, the transaction engine 215 periodically constructs a transaction that is sent to a Smart Contract that executes the workflow illustrated in FIG. 6. This workflow removes old signature records from the distributed ledger 401, so that they are no longer used for similarity detection.

In some embodiments, the transaction engine 215 uses a permissioned blockchain, for example Hyperledger fabric, to construct transactions 405a, 405b and submit them to a distributed ledger node 108. In some embodiments, the transaction engine 215 notifies the participant 310 that first added the document, that was later determined to have been duplicated, when the duplication is detected.

In a preferred embodiment, the pseudocode illustrated in FIG. 8. is a process that is executed by a Smart Contract to store the signatures (hashes) on the Blockchain and perform duplicate signature detection.

The Timer Engine 216 executes a timer that periodically removes records that are older than a specified maximum age from the system. Specifically, the timer engine 216 periodically (e.g., once an hour) removes records older than a maximum age (e.g., 90 days) from the private metadata database 217. The records removed from the private metadata database 217 include the originally submitted document data and metadata, and the similarity detection status. The timer engine 216 also instructs the transaction engine 215 to create a transaction that results in a smart contract executing the workflow illustrated in FIG. 6. This workflow removes old signature records from the distributed ledger 401, so that they are no longer used for similarity detection. In some embodiments, the maximum age is an adjustable parameter that is retrieved and set by a Smart Contract, where the Timer Engine 216 creates transactions to get and set this parameter via the transaction engine 215. In a preferred embodiment, the pseudocode illustrated in FIG. 9. is a process that is executed by a Smart Contract to remove expired signatures (hashes).

FIG. 3. illustrates an example workflow executed by a process running on the Private Document Repository Server 109 to detect a duplicate document. The API engine 210 receives a request to perform document similarity detection 301. The authorization engine 211 examines the request and determines if the request issuer is authorized to perform the request 302. If the request is authorized, then the private document is loaded 303 by the document loader engine 212. This private document is then passed to the normalization engine 213 to normalize the document 304, this process extracts and transforms one or more private document field values to be in a standardized format. The normalized document is then passed to the encoding engine 214 to encode the document 305. The encoding engine 214 generates a several document signatures (first signatures) which are later stored and compared against signatures stored on the distributed ledger 401. The transaction engine 215 constructs a record containing metadata and data related to the private document that it inserts 306 into the private metadata database 217. This record includes a similarity detection status field whose value is initially set to "PENDING" to indicate that the private document is pending similarity detection. The transaction engine 215 then constructs a transaction which includes the first signatures within its payload, and the transaction engine 215 submits this transaction to one or more distributed ledger nodes 108. The distributed ledger nodes 108 run smart contracts implemented as chaincode that execute process illustrated in FIG. 5. As a result of this execution, the transaction engine 215 receives a similarity detection status which determines whether the document was detected as a duplicate.

In some embodiments, the workflow illustrated in FIG. 3. is triggered in response to a user 101 action using a GUI 103. In some embodiments, the workflow illustrated in FIG. 3. is triggered in response to an update in the private document repository 107. In some embodiments, the notification step 310 does not occur, and only the participant that submitted the duplicate is notified of the similarity detection status.

FIG. 4. illustrates records, and their arrangement after private documents have been processed by the system. Within an environment 100 there exists one or more distributed ledger nodes 108 that store and maintain a distributed ledger 401. The nodes 108 communicate using distributed ledger protocols to replicate, verify, and maintain the distributed ledger 401. The ledger 401 is a data structure that includes a list of blocks 402a, and 402b that are ordered in time. Blocks 402a, 402b include metadata, with at least a timestamp 404a, 404b that denotes when the block was generated. Blocks 402a, 402b include transactions 405a, 405b that were previously generated by the transaction engine 215. Transactions 405a, 405b include signatures 406a, 406b which are generated by the encoding engine 214, where each signature is associated 415a, 415b with the private document 414a, 414b that the encoding engine 214 used to generate the signature. The private document repository 109 contains records 407a, 407b which include a similarity detection status field, a reference 417a, 417b to the corresponding first private document 414a, 414b being matched, and one or more references 416a, 416b to transactions 405a, 405b containing the signatures 406a, 406b associated with the first private document. In some embodiments the distributed ledger is stored in a NoSQL database. In some embodiments the entire private document 414a, 414b is contained within the record 407a, 407b.

Figure 5:
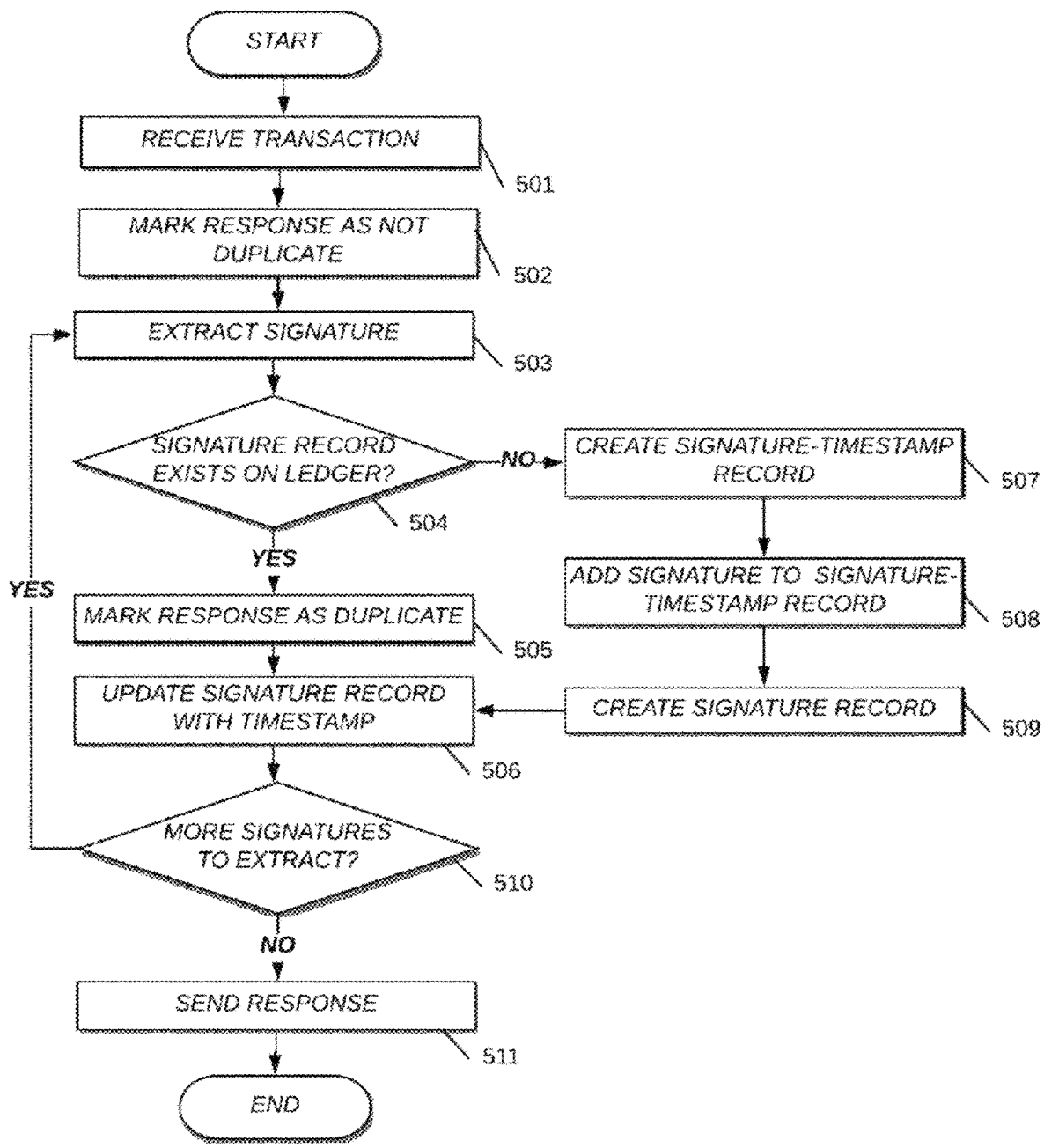
FIG. 5 illustrates an example similarity detection smart contract workflow that is executed when a new documented is added to the private repository network.

FIG. 5. Illustrates an example workflow executed by a Smart Contract running on a distributed ledger node 108 to 1) add a set of signatures to the ledger for the purpose of future detection of similar private documents, and 2) determine the similarity detection status of a private document, using the corresponding signatures of that document, as well as the signatures placed on the ledger. The smart contract receives 501 a transaction generated by the transaction engine 215. The smart contract generates a tentative response 502 that indicates that the signatures correspond to a document that is not a duplicate. The smart contract extracts the signatures 503 from the transaction payload. For each signature the smart contract checks if there exists that same signature already on the ledger 504.

In some embodiments the signature check uses a Counting Bloom Filter data structure as a performance optimization. Specifically, a Counting Bloom Filter is stored on the blockchain and is updated and checked directly by the Smart Contract, using a fast and slow processing path. This performance optimization avoids the Smart Contract from scanning the list of stored signatures by instead first performing an efficient check against the Bloomfilter. In the fast path, the Bloomfilter determines that a claim's signatures are not in the total set and the Smart Contract immediately replies to the Oracle that the claim is not a duplicate. The Oracle immediately relays this status to construct a response to the original request, and in parallel adds the claim signatures to the Bloomfilter as a separate transaction. In many applications non-duplicates are the common case, which uses this fast path to reduce the average processing time. In the slow path, the Bloomfilter determines with high probability that a signature is in the set, and the Smart Contract checks the existing list to determine whether the match was a false positive.

If the signature is not already on the ledger, then the smart contract creates a signature timestamp record 507 stored on the ledger which is used to later efficiently lookup signatures older than a certain age. The smart contract includes the signature within the timestamp record 508. The smart contract creates a signature record 509 that is used to efficiently lookup a particular signature that is stored on the ledger. If the signature is already on the ledger, then the tentative response is updated to include a similarity detection status that denotes the document as a duplicate 505. The signature record is then updated to include a timestamp that represents the current time 506. In some embodiments the current time is included within the transaction payload and set by the transaction engine 215.

The steps starting at step 503 are repeated until there are no remaining signatures within the payload that have not yet been processed 510. The smart contract then sends the response back to the transaction engine 215. In some embodiments, the smart contract executes the workflow illustrated in FIG. 5, as a process written in the Go programming language, running in a Docker container.

Figure 6:
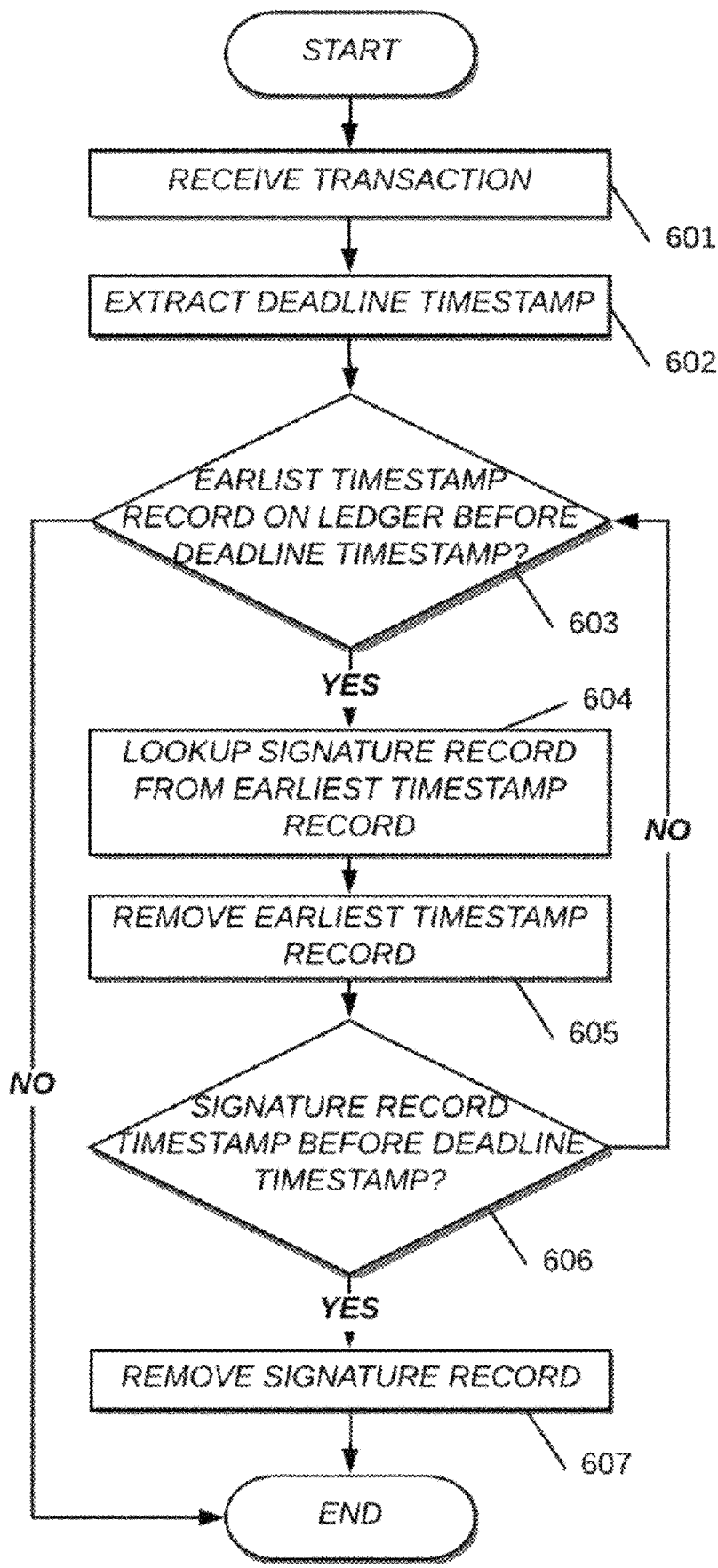
FIG. 6 illustrates an example similarity detection smart contract workflow that is executed periodically to expire old documents from the private repository network.

FIG. 6. Illustrates an example workflow executed by a Smart Contract running on a distributed ledger node 108 to remove stale documents signatures from the ledger. The timer engine 216 periodically generates a transaction that triggers the execution of this workflow. The smart contract receives the transaction 601 issued by the timer engine 216. The smart contract extracts the deadline timestamp 602 to determine which document signatures must be expired, along with their corresponding records. The smart contract then looks up the earliest timestamp for a signature on the ledger using the "signature timestamp record" 507 as an index. If the earliest timestamp is before the deadline timestamp, then the smart contract looks up the corresponding first signature record 604 using data included in the timestamp record. The smart contract then removes the earliest timestamp record 605. If the timestamp within the first signature record timestamp is before the deadline timestamp 605, then the signature record is removed 607. This process is repeated until the earliest timestamp record on the ledger is after the deadline timestamp 603. An example deadline timestamp value that is calculated by the time engine 216 is a unix epoch timestamp that represents exactly 90 days ago from the system's current time. This example deadline timestamp triggers the removal of records that are older than 90 days.

FIG. 7. illustrates pseudocode for a ReceiveClaim process that runs on a private document repository server 107 to construct the signatures (hashes) 406*a*, 406*b* from a normalized claim private document with mutable and immutable fields. The text in bold are names for helper functions that are used to help construct the signatures. SubsetIndices constructs a list of all subsets of size "k" from an original set of size "N". KeyValues returns a list of <key, value> tuples for each field name and field value in a claim "C". Shuffle randomly shuffles a list of signatures to avoid leaking information about the contents of the original private documents. Len returns the length of a list. SubmitHashesToSmartContract constructs a transaction that includes the hashes as signatures to be sent to the Smart Contract which executes the PutHashesInRepository function illustrated in FIG. 8.

FIG. 8. illustrates pseudocode for a PutHashesInRepository process that is executed by a Smart Contract to store the signatures (hashes) on the Blockchain and perform duplicate signature detection of a claim with 36 signatures. This pseudo code assumes a Blockchain infrastructure that provides a key-value store to the Smart Contract, where the Smart Contract can query a range of keys in the underlying store, using a common prefix. The text in bold are names for helper functions that are used to help put the signatures in the repository. The GetNowTimestamp routine retrieves a timestamp for the current time. LoadTimestamp loads a SIGNATURE RECORD 509 given a hash and returns the included signature timestamp if it exists. StoreTimestamp constructs and stores a SIGNATURE RECORD that is indexed by the hash and includes the signature timestamp. StoreKey constructs and stores a SIGNATURE-TIMESTAMP 507 record with a key that is generated from the signature timestamp and signature. MakeKey generates a key from the signature timestamp and signature, for example by concatenating a RFC3339 timestamp with a SHA1 hash.

FIG. 9. illustrates pseudocode for a RemoveExpiredHashes process that is executed by a Smart Contract to remove expired signatures (hashes). This pseudo code assumes a Blockchain infrastructure that provides a key-value store to the Smart Contract, where the Smart Contract can query a range of keys in the underlying store, using a common prefix. The text in bold are names for helper functions that are used to help remove expired SIGNATURE 509 and SIGNATURE-TIMESTAMP 507 records. GetPastTimestamp constructs a timestamp for a date that is exactly a number of days in the past. GetKeysInRange performs a range query to retrieve all keys from the key-value store that have a prefix within a lexicographic range (an inclusive lower and upper bound). HashFromKey extracts a signature from a key for a SIGNATURE-TIMESTAMP 507 record, where the key was generated using the MakeKey function from FIG. 8. TimestampFromKey extracts a signature timestamp from a key for a SIGNATURE-TIMESTAMP 507 record, where the key was generated using the MakeKey function from FIG. 8. DeleteKey removes a record with the passed key. Ceil performs the mathematical ceiling operation which rounds a floating point number to the smallest integer greater than or equal to the passed number.

It will thus be seen that the objects set forth above, among those made apparent from the preceding description, are efficiently attained and, because certain changes may be made in carrying out the above method and in the construction(s) set forth without departing from the spirit and scope of the disclosure, it is intended that all matter contained in the above description and shown in the accompanying drawings shall be interpreted illustrative and not in a limiting sense.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A system for detecting duplicate documents, comprising:
   a distributed ledger node having a smart contract that determines if two private documents are duplicates;
   an environment, coupled to the distributed ledger node, having a processor and a plurality of lines of instructions that configure the processor to:
   generate one or more encoded signatures that correspond to a first document, each encoded signature being a hash of a field pair in the first document generated based on the field pair in the first document and being computationally infeasible to construct the first document from the one or more encoded signatures; and
   store the one or more encoded signatures in the distributed ledger node;
   wherein the distributed ledger node stores one or more encoded signatures for each document in a set of documents;
   wherein the smart contract on the distributed ledger is further configured to compare the one or more encoded signatures of the first document to one or more encoded signatures corresponding to each document in the set of stored documents stored in the distributed ledger node to determine when the first document is a duplicate of one of the set of stored documents while maintaining the privacy of the first document and the set of stored documents; and
   wherein the processor is further configured to notify a user if the first document is a duplicate of the one or more documents in the set of stored documents.

2. The system of claim 1, wherein the first document and each document in the set of documents has at least one immutable data field having a value and a plurality of mutable data fields each having a value, wherein the value of the immutable data field in the first document exactly matches the value of the immutable data field in a particular document in the set of documents to determine that the first document and the particular document are duplicates.

3. The system of claim 2, wherein the smart contract on the distributed ledger is further configured to determine when the first document and a particular document in the set of documents are duplicates if a majority of the values in each of the mutable fields in the first document are the same as the values in each of the mutable fields in the particular document.

4. The system of claim 1, wherein the first document and each document in the set of documents has at least one immutable data field having a value.

5. The system of claim 1, wherein the first document and each document in the set of documents has at least one mutable data field having a value.

6. The system of claim 1, wherein the distributed ledger is further configured to construct a distributed ledger transaction to store the one or more signatures for each document.

7. The system of claim 6, wherein the distributed ledger transaction stores the one or more signatures in a payload of the distributed ledger transaction.

8. The system of claim 1, wherein the first document is a medical claim document having an immutable field that contains a social security number and a plurality of mutable fields.

9. The system of claim 8, wherein the smart contract in the distributed ledger node is further configured to detect that the first document and a particular document in the set of documents are duplicate when the value of the immutable data field in the first document exactly matches the value of the immutable data field in the particular document in the set of documents.

10. The system of claim 9, wherein the smart contract in the distributed ledger is further configured to determine that the first document and the particular document are duplicates when a majority of the values in each of the mutable fields in the first document are the same as the values in each of the mutable fields in the particular document.

11. The system of claim 1, wherein each signature is a hash of a document and each hash uses a different hash function.

12. The system of claim 1 further comprising a second environment, coupled to the distributed ledger node, having at least a processor and a plurality of lines of instructions, wherein the first document is stored in the environment and the set of documents are stored in the second environment.

13. The system of claim 1, wherein the environment has a metadata database having a plurality of records and the environment is further configured to periodically purge each record whose age exceeds a maximum age from the metadata database.

14. The system of claim 6, wherein the distributed ledger is further configured to remove stale document signatures that are stored in the distributed ledger.

15. A method for detecting duplicate documents, comprising:
   retrieving a document having a field pair wherein each field contains data having a value;
   generating, by an encoding engine in a computer based environment, one or more encoded signatures that correspond to the retrieved document, each encoded signature being a hash of the field pair in the retrieved document generated based on the field pair in the retrieved document and being computationally infeasible to construct the first document from the one or more encoded signatures;
   storing the one or more encoded signatures in the distributed ledger node, wherein the distributed ledger node stores one or more encoded signatures for each document in a set of documents;
   determining, by a computer having a smart contract on a distributed ledger, whether the retrieved document is a duplicate of a document of the set of stored documents that each have the one or more encoded signatures, wherein determining whether the retrieved document is a duplicate further comprises comparing the one or more encoded signatures of the retrieved document to the one or more encoded signatures in each document in the set of stored documents while maintaining the privacy of the first document and the set of stored documents; and
   notifying a user when the retrieved document is a duplicate of at least one of the one or more documents in the set of stored documents.

16. The method of claim 15, wherein the first document and each document in the set of documents has at least one immutable data field having a value and a plurality of mutable data fields each having a value and wherein determining if the retrieved document is a duplicate further comprises determining that the retrieved document is a duplicate when the value of the immutable data field in the retrieved document exactly matches the value of the immutable data field in a particular document in the set of documents.

17. The method of claim 16, wherein determining if the retrieved document is a duplicate further comprises determining that the retrieved document is a duplicate when a majority of the values in each of the mutable fields in the retrieved document is the same as the values in each of the mutable fields in the particular document.

18. The method of claim 15, wherein the retrieved document and each document in the set of documents has at least one immutable data field having a value.

19. The method of claim 15, wherein the retrieved document and each document in the set of documents has at least one mutable data field having a value.

20. The method of claim 15, wherein storing the one or more signatures further comprises constructing a distributed ledger transaction to store the one or more signatures.

21. The method of claim 20, wherein storing the one or more signatures further comprises storing the one or more signatures in a payload of the distributed ledger transaction for each document.

22. The method of claim 15, wherein generating the one or more signatures further comprising hashing each document to generate the signature.

23. The method of claim 15, wherein the retrieved document is a medical claim document having an immutable field that contains a social security number and a plurality of mutable fields.

24. The method of claim 23, wherein detecting if the retrieved document is a duplicate further comprises determining that the retrieved document is a duplicate when the value of the immutable data field in the retrieved document exactly matches the value of the immutable data field in a particular document in the set of documents.

25. The method of claim 24, wherein determining if the retrieved document is a duplicate further comprises determining that the retrieved document is a duplicate when a majority of the values in each of the mutable fields in the retrieved document is the same as the values in each of the mutable fields in the particular document.

26. The method of claim 15, wherein each signature is a hash of document and each hash uses a different hash function.

27. The method of claim 15 further comprising periodically purging each record whose age exceeds a maximum age from a metadata database in the computer based environment.

28. The method of claim 20 further comprising removing stale document signatures that are stored in the distributed ledger.

* * * * *